US007026915B2

(12) United States Patent
Ohmura et al.

(10) Patent No.: US 7,026,915 B2
(45) Date of Patent: Apr. 11, 2006

(54) INFORMATION SERVICE METHOD AND ITS COMPUTER PROGRAM (75) Inventors: Hiroshi Ohmura, Hiroshima-ken (JP); Kouji Hosoda, Hiroshima-ken (JP); Kenichi Ikeda, Hiroshima-ken (JP)

(73) Assignee: Mazda Motor Corporation, Hiroshima (JP)

( * ) Notice: Subject to any disclaimer, the term of this patent is extended or adjusted under 35 U.S.C. 154(b) by 317 days.

(21) Appl. No.: 10/372,268

(22) Filed: Feb. 25, 2003

(65) Prior Publication Data
US 2003/0174047 A1    Sep. 18, 2003

(30) Foreign Application Priority Data
Mar. 12, 2002    (JP)    ............... 2002-067276

(51) Int. Cl.
*H04Q 7/00*    (2006.01)
(52) U.S. Cl. ............. 340/7.48; 340/991; 701/206; 455/456
(58) Field of Classification Search ............... 340/7.48, 340/7.52, 286.14, 995.12, 825.72, 9.91; 455/414.1, 455/412.2, 456; 713/181; 709/204; 701/206
See application file for complete search history.

(56) References Cited

U.S. PATENT DOCUMENTS 6,754,485 B1 *    6/2004    Obradovich et al. ..... 455/414.1
6,810,323 B1 *    10/2004    Bullock et al. ............. 701/206

FOREIGN PATENT DOCUMENTS

| EP | 733 983 A2 | 9/1996 |
| EP | 749 081 A1 | 12/1996 |
| JP | 11-101653 | 4/1999 |
| WO | WO 01/06380 A1 | 1/2001 |
| WO | WO 01/97037 A1 | 12/2001 |

OTHER PUBLICATIONS

Hosoda Koji, Patent Abstracts of Japan, "Vehicular Navigation Device, System and Method for Communication Navigation, and Computer-Readable Storage Media", Publication No. 2001-91274, Publication Date: Apr. 6, 2001.

* cited by examiner

*Primary Examiner*—Michael Horabik
*Assistant Examiner*—Matsuichiro Shimizu (57) ABSTRACT Upon providing information from an information center (1) to the user of a navigation apparatus (2) connected via a wireless/wired communication line, the user sets a category used to specify contents that he or she wants to receive, and a service timing of the contents to the user of the navigation apparatus (2) in advance. The information center (1) provides contents, which are extracted from many unspecified contents provided from a contents service center (6) and satisfy the category, to the navigation apparatus (2). The navigation apparatus (2) provides the acquired contents to the user in accordance with the service timing.

9 Claims, 9 Drawing Sheets

SPORTS INFORMATION SETUP (BASEBALL LIVE PROGRAM)

- 6-1 SET BASEBALL CLUB AND PLAYER ABOUT WHICH YOU WANT TO RECEIVE INFORMATION
  ☐ GIANTS  ■ HIROSHIMA  ☐ HANSHIN...
  ☐ PLAYER ○○  ■ PLAYER △△

- 6-2 DESIGNATE EVENT WHICH MAY OCCUR DURING GAME
  ■ OFFENCE  ■ SCORE  ■ ON-BASE  ■ OUT  ■ REPLACEMENT OF PITCHER  ☐ HOME RUN

- 6-3 INFORMATION SERVICE TIME TO VEHICLE SIDE
  START TIMING : ×× SEC BEFORE OCCURRENCE OF DESIGNATED EVENT
  END TIMING : ■ ×× SEC AFTER OCCURRENCE OF DESIGNATED EVENT
  ☐ UNTIL END OF DESIGNATED EVENT

- 6-4 SET INFORMATION SERVICE TIMING IN VEHICLE
  ☐ ALWAYS  ☐ ALWAYS IF HIROSHIMA IS ON OFFENCE  ■ AT STOP OF VEHICLE
  ☐ REAL TIME IF HIROSHIMA IS ON OFFENCE (PROVIDE 20 SEC BEFORE AND AFTER EVENT)
  ☐ REAL TIME IF PLAYER ○○ APPEARS

- 6-5 SET INFORMATION ACQUISITION SOURCE : △△ RADIO 72.5 MHz
- 6-6 SET INFORMATION SERVICE METHOD
  ☐ TWO-WINDOW  ■ TEXT-TO-SPEECH  ☐ SUPERIMPOSE
  <SET CONDITION>

- 6-7 INFORMATION SERVICE DESTINATION : PC MY PAGE (ID: 1111)
  : VEHICLE (ID: 22222)

...

REGISTER

INFORMATION SERVICE METHOD AND ITS COMPUTER PROGRAM

FIELD OF THE INVENTION

The present invention relates to the field of an information service apparatus which provides information to a user's information terminal on-line via a communication line.

BACKGROUND OF THE INVENTION

Conventionally, a technique for providing various kinds of information from an information center to an on-board navigation apparatus having a communication function using a communication environment such as the Internet or the like has been proposed. For example, Japanese Patent Laid-Open No. 11-101653 discloses a technique for distributing map information or the like from an information center to an on-board navigation apparatus.

According to the conventional system, the user can acquire various kinds of useful information during traveling to a destination, thus allowing efficient traveling.

However, since the conventional system can provide a large variety of contents (information) to the user, many contents are unnecessary for some users, resulting in poor convenience.

As a method of enjoying live programs of marathon races or baseball games, the user may often want to view only a climax scene of that live program or a scene in which a user's favorite player appears in place of viewing from the beginning to the end of the program. Especially, when a plurality of passengers travel using a vehicle, since the contents that individual passengers want are normally different, some passengers may be dissatisfied if contents such as the aforementioned live program of a marathon race or baseball game are provided for a long period of time in a passenger room.

When various contents are provided by the aforementioned system to a driver who drives a vehicle, such system must be designed not to disturb the driver's concentration while he or she drives.

SUMMARY OF THE INVENTION

The present invention has been proposed to solve the conventional problems, and has as its object to provide an information service method and its computer program, which provide only a required part of information of user's choice at a timing appropriate for that user.

In order to achieve the above object, an information service method according to the present invention is characterized by having the following arrangement.

That is, an information service method for providing information from an information service apparatus to a user of an information terminal connected via a communication line, comprises: a setting step of allowing the user to set a category used to specify contents that the user wants to receive, a predetermined condition used to specify partial contents of user's choice in contents which belong to the category, and a service timing of the partial contents to the user in the information terminal; and a information service step of extracting partial contents which satisfy the category and the predetermined condition from many unspecified contents, and providing the extracted partial contents to the user at the service timing in the information terminal.

According to the present invention, an information service method and its computer program which provide only a required part of information of user's choice at a timing appropriate for that user can be provided.

That is, according to the present invention, since partial contents which satisfy a category and condition of user's choice are provided at the timing of user's choice, various other contents that the user does not want, or even contents which satisfy the category of user's choice can be prevented from being provided endlessly, and the user can efficiently acquire only required partial contents, resulting in high convenience.

For example, when the category and the predetermined condition are set in the information service apparatus while the service timing is set in the information terminal in the setting step, and in the information service step, the information service apparatus provides the partial contents extracted from the many unspecified contents to the information terminal, and the information terminal provides the provided partial contents to the user in accordance with the service timing.

According to the above arrangement, since the service timing of partial contents to the user can be controlled on the information terminal (e.g., a navigation apparatus equipped in a vehicle) side, the processing load on the information service apparatus can be reduced, and a practical system arrangement can be realized.

For example, when the category, the predetermined condition, and the service timing are all set in the information service apparatus in the information terminal in the setting step, in the information service step, the information service apparatus extracts partial contents to be provided to the information terminal from the many unspecified contents, temporarily stores the extracted partial contents, and provides the temporarily stored partial contents to the information terminal in accordance with the service timing.

According to the above arrangement, since the service timing of partial contents to the user can be controlled on the information service apparatus side, the processing load on the information terminal (e.g., a navigation apparatus equipped in a vehicle) can be reduced, and the apparatus arrangement can be simplified.

In a preferred embodiment, in said information service step, the partial contents that satisfy the category and the predetermined condition are extracted by analyzing the many unspecified contents on the basis of the category and the predetermined condition.

According to the above arrangement, by analyzing many unspecified contents using a method such as speech analysis, text mining, or the like, partial contents which satisfy the category and condition of user's choice can be accurately extracted.

In this case, when a sports live program is selected as the category, the setting step allows the user to set at least one of a team and player of his or her choice, and an event that may occur during a game, which are associated with the selected sports live program, as the predetermined condition, and in the information service step, a part of contents associated with the sports live program as partial contents to be provided to the information terminal is extracted by analyzing the many unspecified contents on the basis of the predetermined condition associated with the sports live program which is set as the category in the setting step.

According to the above arrangement, when a team, player, and an event that occurs during the game are detected from many unspecified contents, since the information service apparatus can extract corresponding partial contents, the user can selectively acquire only a part on which he or she is keen in a sports live program that normally requires a long period of time, resulting in high convenience.

Note that the sports live program is, for example, a professional baseball live program, and the event which may occur during the game includes at least one of a home run, replacement of a pitcher, and an offence, on-base, and score of a team and/or player of user's choice.

For example, when contents of the sports live program are sequentially stored in a database as an actual game progresses, the setting step allows, when the event which may occur during the game is set, the user to set a service period of partial contents to be provided to the information terminal in the information service step in accordance with occurrence of that event, and in the information service step, contents of the sports live program stored in the database can be extracted, as the partial contents to be provided to the information terminal, from a timing before occurrence of the event in accordance with the service period set in the setting step.

According to the above arrangement, when a desired event set by the user has taken place, since the information service apparatus provides partial contents from a timing before the timing at which the event takes place, the user can recognize not only the result of a given event but also a process before that event takes place like a home run or the like in a professional baseball live program. Although the service timing slightly falls behind the actual game timing, high convenience can be maintained since entertainment of partial contents to be provided is not impaired.

For example, when the method further comprises a contents specifying step of specifying specific contents which satisfy the category of user's choice from the many unspecified contents on the basis of the category, prior to the information service step, the information service step preferably provides information that allows the information terminal to directly acquire the specific contents from the information service apparatus to the information terminal when it is determined by analyzing the specific contents specified in the contents specifying step on the basis of the predetermined condition that the specific contents are currently provided while being satisfying the predetermined condition as well as the category.

According to the above arrangement, when the user wants to acquire his or her desired contents in real time, that user can adequately acquire the corresponding contents, resulting in high convenience.

In any of the above cases, for example, the setting step preferably allows the user to set an acquisition source of the partial contents to be provided to the information terminal.

In any of the above cases, the setting step preferably allows the user to set an acquisition source of the contents to be provided to the information terminal.

The above object can also be achieved by an information service apparatus corresponding to the information service method having the aforementioned arrangements.

Also, the above object can also be achieved by a program code which implements the information service method or apparatus with the above arrangements using a computer having a communication function, and a computer readable storage medium that stores the program code.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment in which an information service system according to the present invention is formed by, e.g., a navigation apparatus as an information terminal equipped in a vehicle (automobile) and an information center will now be described in detail in accordance with the accompanying drawings.

Figure 1:
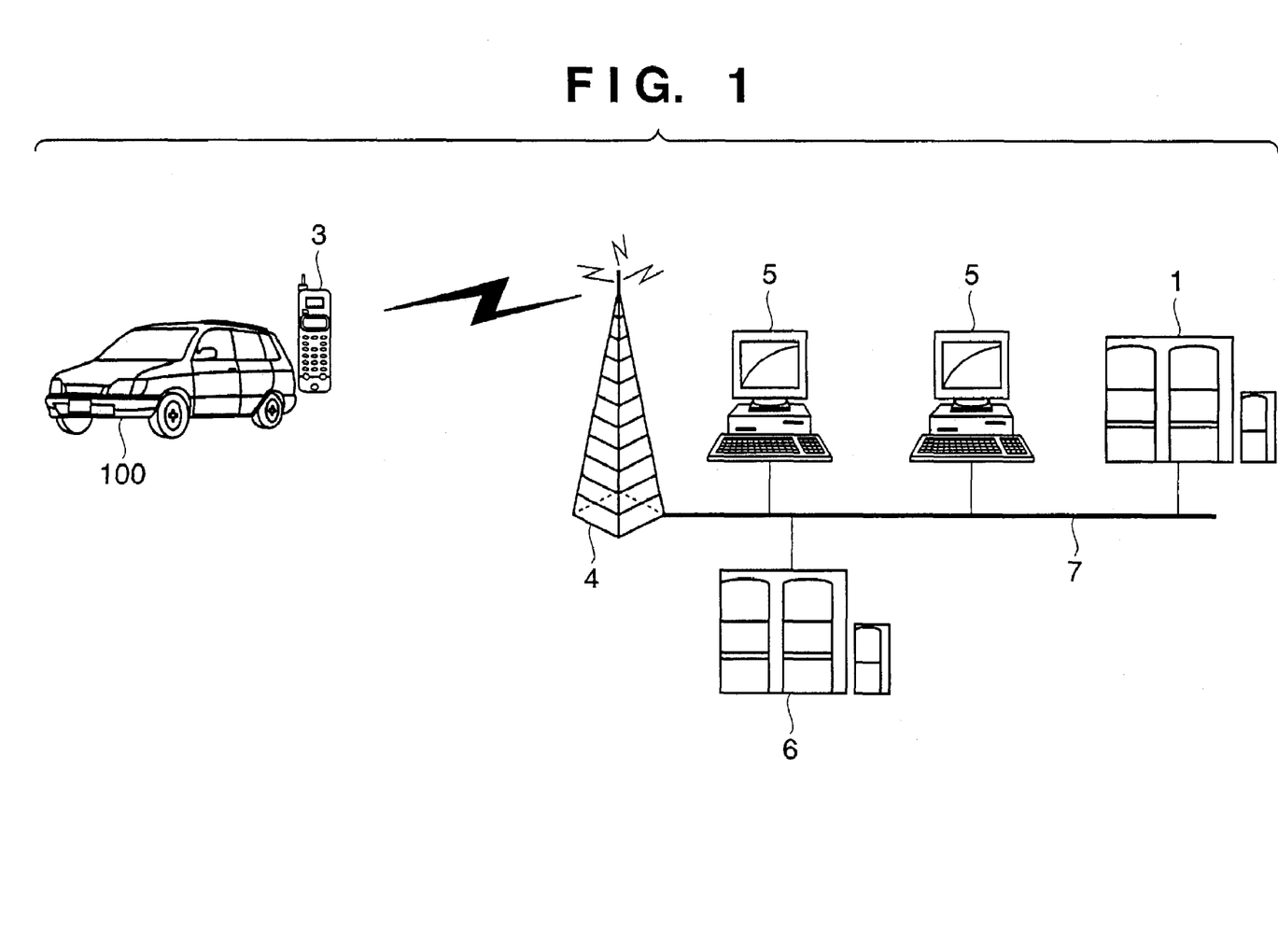
FIG. 1 is a view exemplifying an outline of an information service system as a whole according to an embodiment of the present invention.
Figure 2:
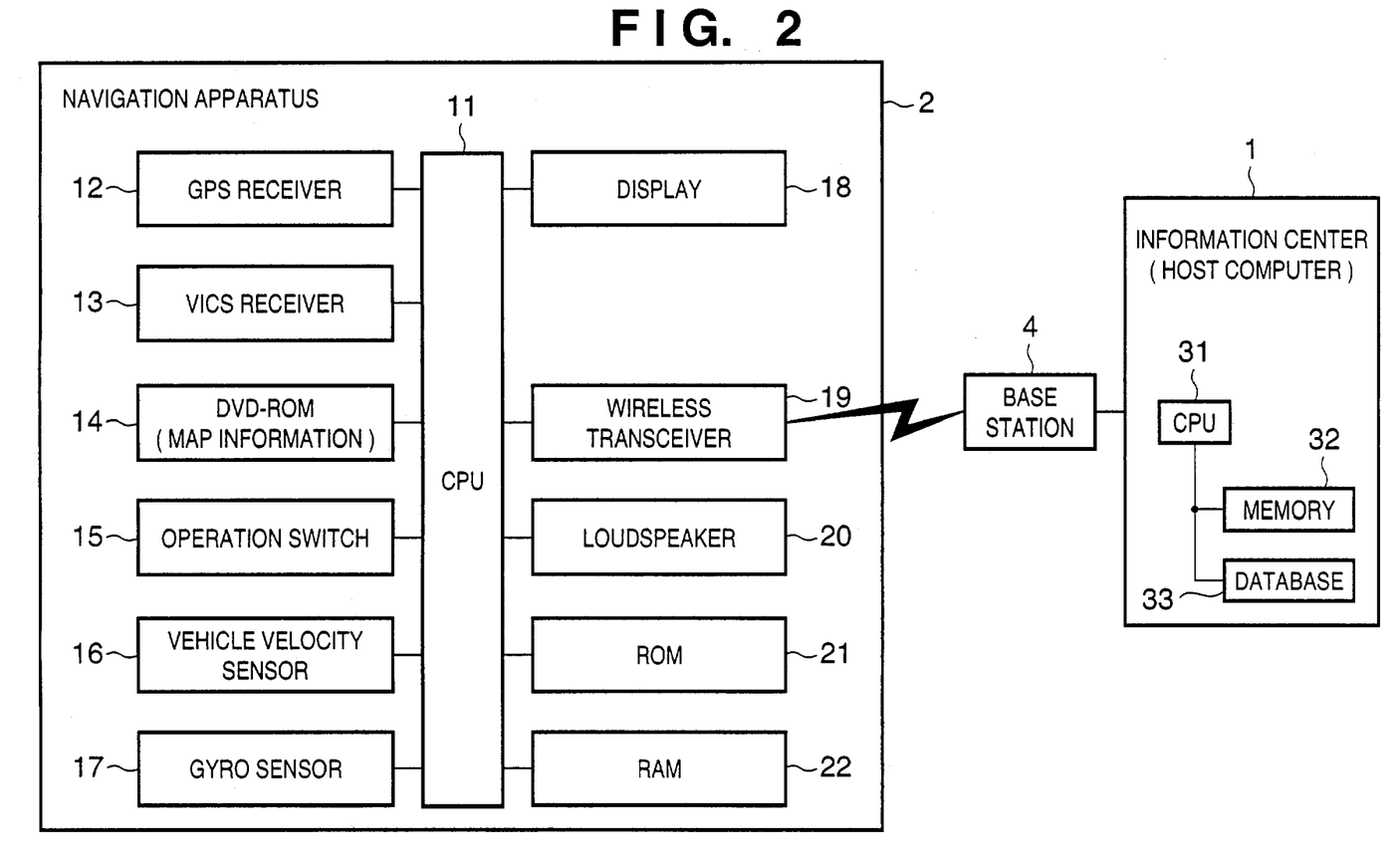
FIG. 2 is a block diagram exemplifying the arrangements of an information center 1 and navigation apparatus 2 which form the information service system in the embodiment of the present invention.

FIG. 1 exemplifies an outline of an information service system as a whole according to this embodiment. FIG. 2 is a block diagram showing an example of the arrangements of an information center 1 and navigation apparatus 2, which form the information service system of this embodiment.

Referring to FIGS. 1 and 2, an information center 1 is an information processing apparatus (information service apparatus) such as a server computer or the like, which has a communication function. A CPU 31 of the information center 1 receives various contents provided by a contents service center 6 via a communication network 7 such as the Internet or the like, and makes data communications with a navigation apparatus 2 as a user's information terminal via the communication network 7 and a wireless communication base station 4 with reference to a database 33 to provide contents (information) of user's choice by executing various software programs of, e.g., an information service process according to this embodiment, a general communication process, and the like, which are stored a memory (storage medium) 32 (details of such processes will be described later).

The database (DB) 33 stores records of categories of contents that respective users want to receive, user identification (ID) information, and the like in association with a plurality of users who can receive contents by the information service process according to this embodiment.

The navigation apparatus 2 is an information terminal that a passenger (driver or the like) of a vehicle 100 that can receive an information service of this system uses. The navigation apparatus 2 implements a general navigation function as an on-board machine, and can make data communications with the information center 1 via a wireless transceiver 19, the base station 4, and the communication network 7, while it is mounted on the vehicle 100.

More specifically, the navigation apparatus 2 has general navigation function software (software program), which is stored in a storage device such as a ROM 21 or the like, and gives a route guide of a destination of user's choice. When a CPU 11 executes this software with reference to a RAM 22 as needed, the navigation apparatus 2 displays a map image around the vehicle 100 on a display 18 on the basis of the current position detected by a GPS (global positioning system) receiver 12, traffic information detected by a VICS receiver 13, the operation state of switches 15 by the user, map information around the current position, which is read out from a storage medium such as a DVD-ROM 14 or the like, the detection results of a vehicle velocity sensor 16 and gyro sensor 17, and the like. Also, when the user has set a destination of his or her choice, the navigation apparatus 2 gives a route guide to that destination using synthetic speech or the like output from a loudspeaker 20.

Furthermore, the navigation apparatus 2 has software (software program) of a general communication protocol which is stored in the storage device such as the ROM 21 or the like, and can implement an information acquisition process (to be described in detail later) according to this embodiment and Internet communications, an Internet browser function and mail function which exchange data with an external apparatus via the wireless transceiver 19 in accordance with that software, and a general software group which draws a browser. When the CPU 11 executes such software with reference to the RAM 22 as needed, the navigation apparatus 2 receives various kinds of information provided by the information center 1.

Note that this embodiment will exemplify the navigation apparatus 2 mounted on the vehicle 100 as an information terminal that receives an information service. However, the present invention is not limited to such specific terminal, and information may be provided to a portable information terminal 3 such as a user's portable phone or the like, as shown in FIG. 1.

The contents service center 6 is an information processing apparatus such as a server computer or the like, which has a communication function. A CPU (not shown) of the contents service center 6 provides various contents such as various television and radio programs (including so-called Internet television and radio programs) stored in a database (not shown), a live coverage of a sports program, and the like to the information center 1 and an external apparatus such as a user terminal 5 set in a home, or the like, and sequentially stores the contents of the live coverage of the sports program in the database.

An information service provided by this embodiment will be explained in detail below by explaining a practical operation example of the information center 1 and navigation apparatus 2.

<Information Center 1>

Figure 8:
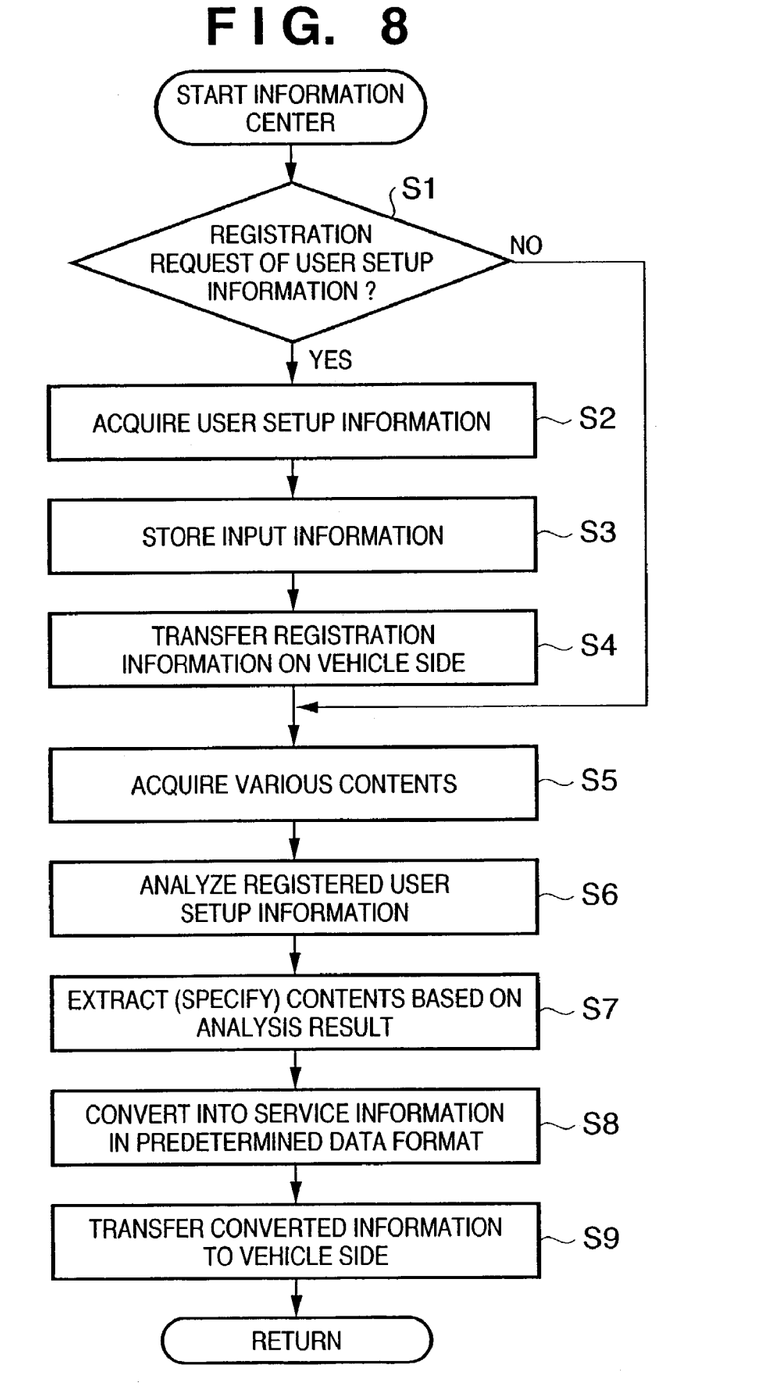
FIG. 8 is a flow chart showing an information service process to be executed by the information center 1 in the embodiment of the present invention.

FIG. 8 is a flow chart showing an information service process executed by the information center 1 in this embodiment, i.e., the processing sequence to be executed by the CPU 31 of the information center 1.

Step S1 in FIG. 8: The information center 1 checks if a registration request of user setup information from the navigation apparatus 2 that is used by the user who is eligible to receive an information service of this system, or from the user terminal 5 corresponding to the user of that navigation apparatus is detected. If a registration request is detected, the flow advances to step S2; otherwise, the flow jumps to step S5.

Note that "user setup information" includes information such as a category of information of user's choice, a condition upon providing that information to the user, a service timing, and the like, which are set by the user using user setup windows (FIGS. 3 to 6) (details will be described later).

Steps S2 and S3: The information center 1 transmits information required to display user setup windows shown in FIGS. 3 to 6 to the navigation apparatus 2 or corresponding user terminal 5, which issued the registration request of the user setup information, in accordance with user's operation. The information center 1 receives user setup information that represents user's setup operations on the user setup windows (FIGS. 3 to 6), which is displayed on the navigation apparatus 2 or user terminal 5 in accordance with the transmitted information (step S2), and stores the received information in the database 33 as a record of the user setup information associated with that user (step S3).

Figure 3:
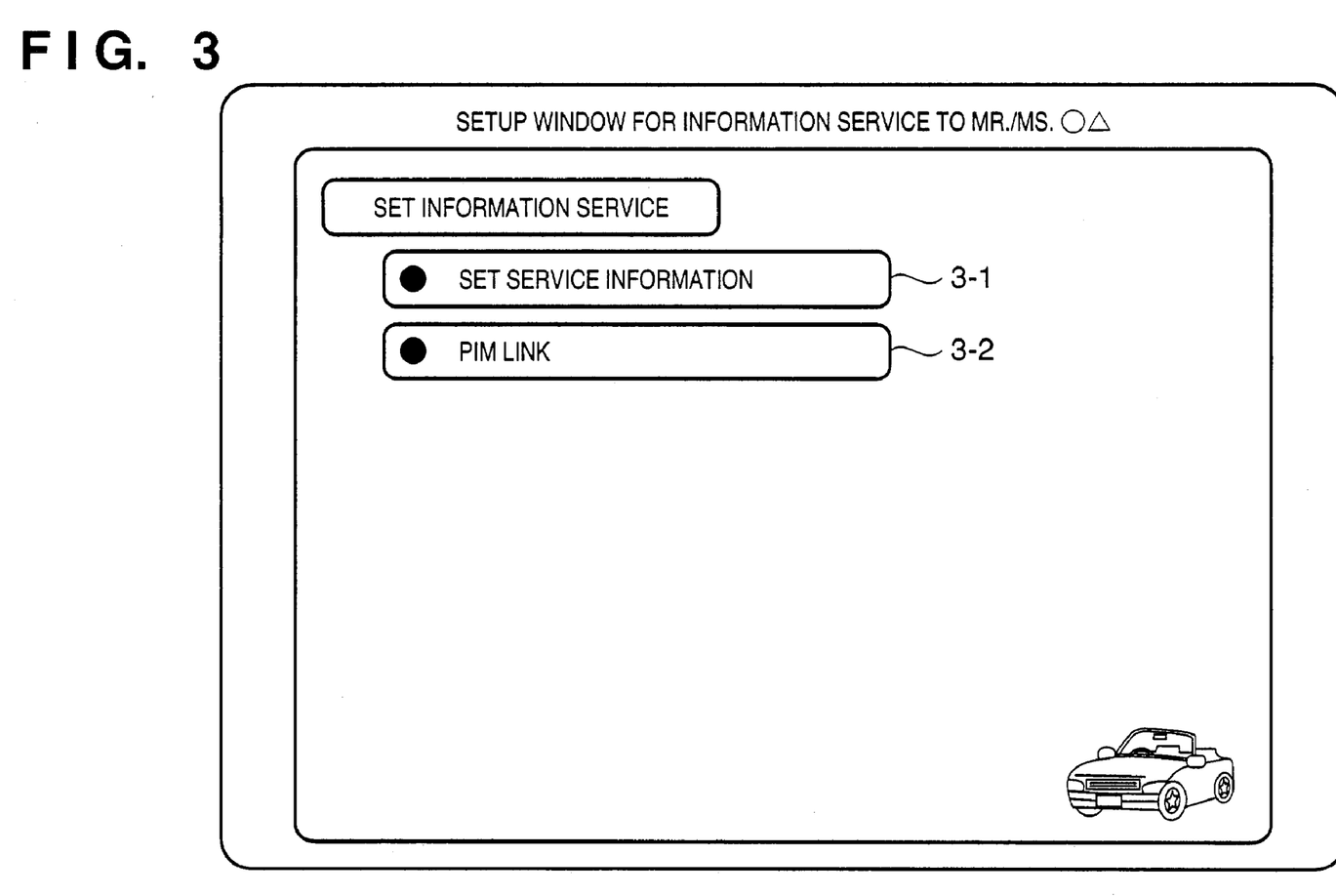
FIG. 3 shows an example of a menu window which is displayed, upon registration of user setup information, on the navigation apparatus 2 or a user terminal 5 that the user who receives an information service according to the embodiment of the present invention uses.

FIG. 3 shows an example of a menu window which is displayed on the navigation apparatus 2 or user terminal 5 of the user who receives an information service according to this embodiment, upon registering user setup information.

Item 3-1: When the user has selected this item, he or she can desirably set a category, service timing, and the like of contents (information) provided by the information center 1.

Item 3-2: When the user has selected this item, he or she can input or refer to personal management information (PIM: Personal Information Manager) by accessing a function of application software for personal schedule management, which runs on the information center 1.

Figure 4:
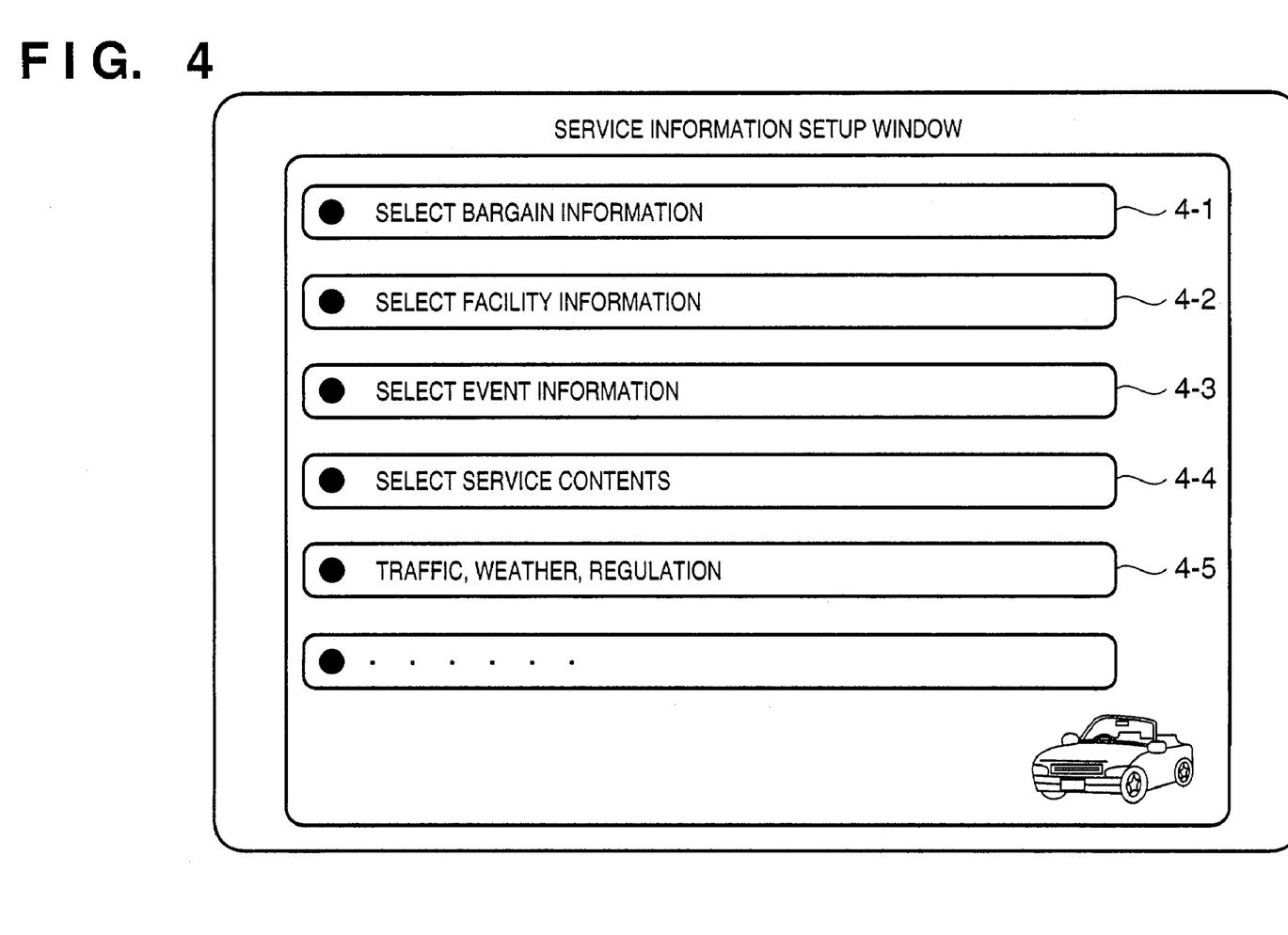
FIG. 4 shows an example of a sub-menu window displayed when an item 3-1 has been selected on the menu window shown in FIG. 3.

FIG. 4 shows an example of a sub-menu window displayed when the user has selected the item 3-1 on the menu window shown in FIG. 3. The user can select a desired category of contents that he or she wants to receive from major classes.

Item 4-1: When the user has selected this item, he or she can set to acquire, at a desired service timing, only contents associated with, e.g., bargain information (a bargain sale or the like) among many unspecified contents provided from the contents service center 6 on a customize window (not shown).

Item 4-2: When the user has selected this item, he or she can set to acquire, at a desired service timing, only contents associated with, e.g., various kinds of facility information (amusement parks, tourist sites, and the like) among many unspecified contents provided from the contents service center 6 on a customize window (not shown).

Item 4-3: When the user has selected this item, he or she can set to acquire, at a desired service timing, only contents associated with, e.g., various kinds of event information (exhibitions and the like) among many unspecified contents provided from the contents service center 6 on a customize window (not shown).

Item 4-4: When the user has selected this item, he or she can set categories and contents of his or her desired service contents among many unspecified contents provided from the contents service center 6, and can set to acquire such contents at a desired service timing on a customize window (FIG. 5).

Item 4-5: When the user has selected this item, he or she can set to acquire, at a desired service timing, only contents associated with, e.g., various kinds of traffic, weather, and regulation information among many unspecified contents provided from the contents service center 6 on a customize window (not shown).

Figure 5:
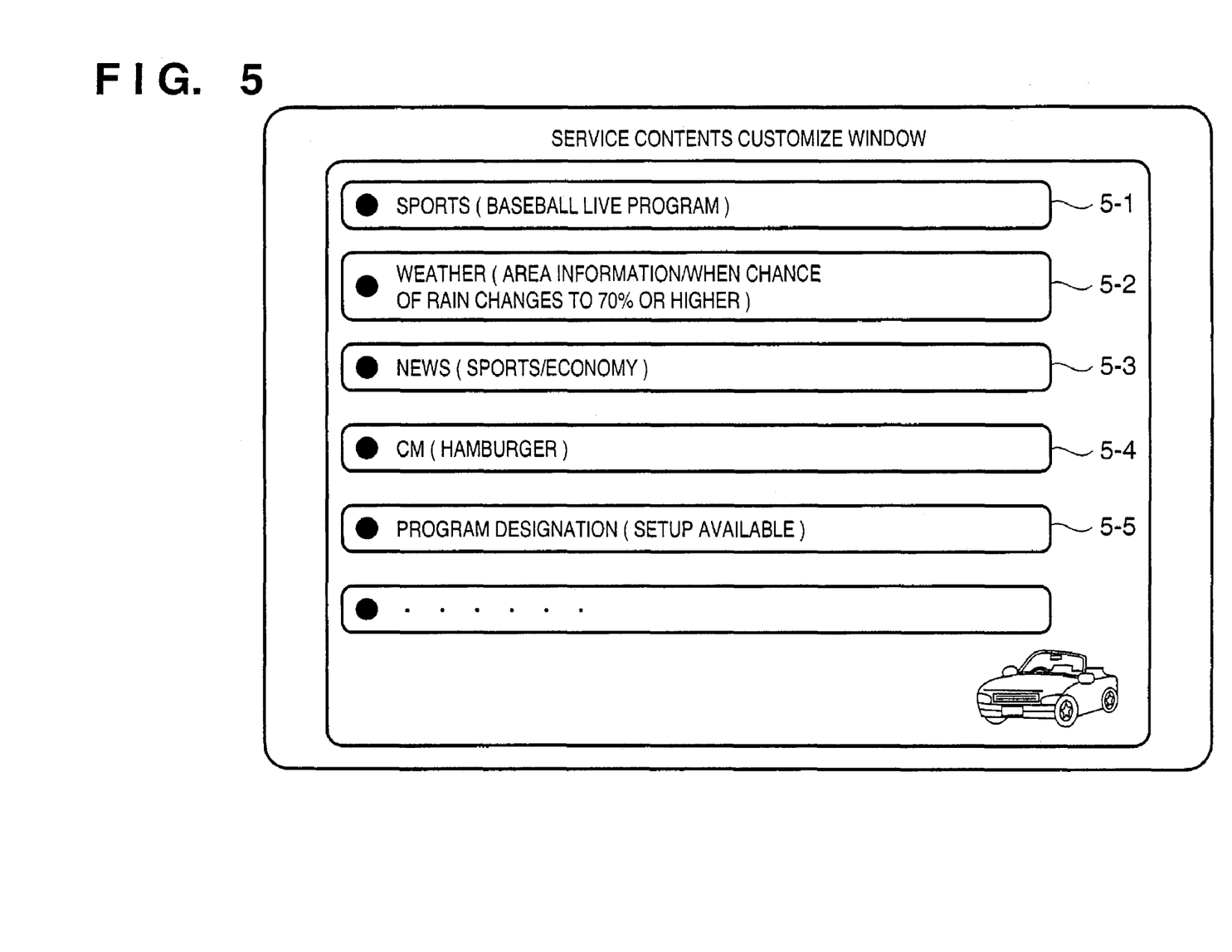
FIG. 5 shows an example of a service contents customize window displayed when an item 4-4 has been selected on the sub-menu window shown in FIG. 4.

FIG. 5 shows an example of a customize window of service contents displayed upon selection of the item 4-4 on the sub-menu window shown in FIG. 4. The user can desirably customize the categories and contents of contents that he or she wants to receive an information service using this customize window.

Note that items shown in FIG. 5 may be selected by checking check boxes (or radio buttons or the like), as shown in FIG. 5, or may be input as so-called free words.

Figure 6:
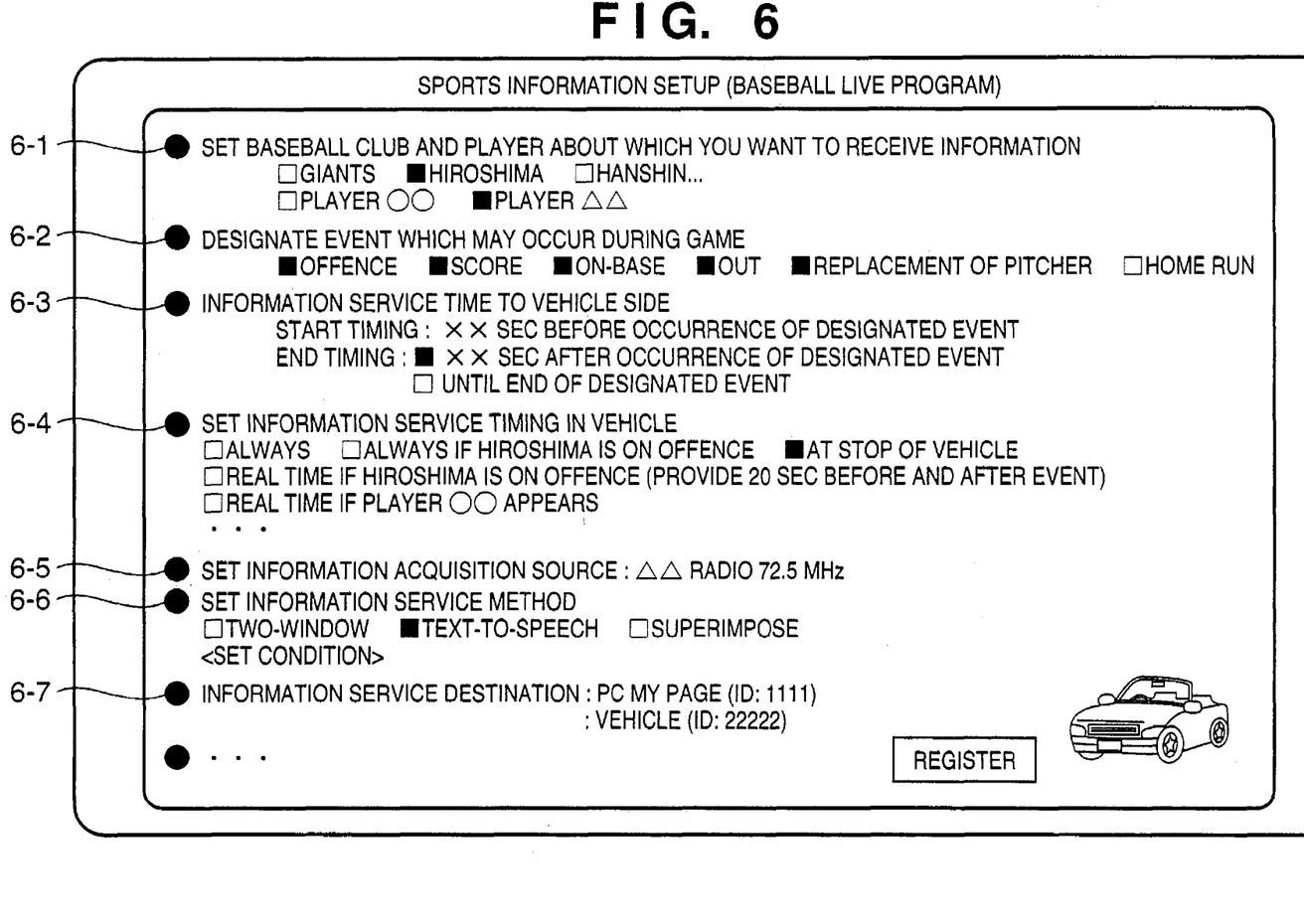
FIG. 6 shows an example of a detail setup window of a sports program displayed when an item 5-1 is selected on the customize window shown in FIG. 5.

Item 5-1: When the user has selected this item, he or she can make detailed setups for acquiring, at a desired service timing, only contents associated with sports among many unspecified contents provided from the contents service center 6 on a detail setup window (FIG. 6). The item 5-1 shown in FIG. 5 exemplifies a state wherein the user has selected "baseball live" as a category of his or her desired sports.

Item 5-2: When the user has selected this item, he or she can make detailed setups for acquiring, at a desired service timing, only contents associated with weather (e.g., a weather report or the like) among many unspecified contents provided from the contents service center 6 on a detail setup window (not shown). The item 5-2 shown in FIG. 5 exemplifies a state wherein the user has set "area information" as a category of weather of his or her choice, and "when chance of rain has changed to 70% or higher" as a service timing.

Item 5-3: When the user has selected this item, he or she can make detailed setups for acquiring, at a desired service timing, only contents associated with various news articles among many unspecified contents provided from the contents service center 6 on a detail setup window (not shown). The item 5-3 shown in FIG. 5 exemplifies a state wherein the user has selected "sports/economy" as a category of news programs of his or her choice.

Item 5-4: When the user has selected this item, he or she can make detailed setups for acquiring, at a desired service timing, only contents associated with various commercial messages among many unspecified contents provided from the contents service center 6 on a detail setup window (not shown). The item 5-4 shown in FIG. 5 exemplifies a state wherein the user has selected "hamburger" as a category of commercial messages of his or her choice.

Item 5-5: When the user has selected this item, he or she can make detailed setups for acquiring, at a desired service timing, only contents associated with desired programs among many unspecified contents provided from the contents service center 6 on a detail setup window (not shown). The item 5-5 shown in FIG. 5 indicates the presence of the setup of his or her desired program.

FIG. 6 shows an example of a detail setup window of a sports program displayed upon selection of the field 5-1 on the customize window shown in FIG. 5. The user can desirably customize the contents and service timing of a sports program about which he or she wants to receive an information service, using this detail setup window.

Field 6-1: The user can set a baseball club and player about which he or she wants to receive an information service from a plurality of choices in that field.

Field 6-2: The user can specify the contents of contents that he or she wants to receive an information service by setting desired ones of various events such as offence, score, on-base, out, replacement of a pitcher, home run, and the like, which may occur during the game in that field.

In this case, the information center 1 sets a part of a series of contents as an object to be provided to the user when one of events selected in the field 6-2 has occurred for the baseball club and/or player of user's choice set in the field 601 during the progress of the game of baseball live contents of interest (i.e., a baseball live program in which the baseball club and/or player of user Is choice appear or appears) in step S7 (to be described later).

Field 6-3: The user can set an information service time (period) per service when the contents provided by the information center 1 are played back on the navigation apparatus 2 in this field. More specifically, the user can set a desired period before the timing of occurrence of each designated event selected in the field 6-2 as the start timing of service contents, and also a desired period after that timing as the end timing. If at least one of the start and end timings are not set, the information center 1 automatically selects the timing of occurrence and/or end (completion) timing of an event selected in the field 602.

Field 6-4: The user can set a playback timing of the contents provided by the information center 1 (i.e., the contents with a time period of user's choice set in the field 603) on the navigation apparatus 2 in this field. More specifically, the user can set a desired timing from a plurality of choices such as "always", "always when the desired baseball club selected in the field 601 is on the offense", "at a stop of the vehicle 100", and the like.

Furthermore, the user can set to play back contents in real time when the desired baseball club selected in the field 6-1 is on the offence or when the desired player selected in the field 6-1 appears. When "at a stop of the vehicle" is selected as a desired timing together with real-time playback, since the provided contents are played back on the navigation apparatus 2 while the vehicle 100 is at a stop, the status (live contents) of an actual game cannot be played back in real time on the navigation apparatus 2. Hence, intermittent or fastforwarding playback may be automatically made to catch up actual live contents at the current time an elapse of a certain time period after the beginning of playback of the contents.

Field 6-5: The user can set a desired channel, radio station, or the like as an acquisition source (information source) of contents to be received from the information center 1 in this field.

Figure 7:
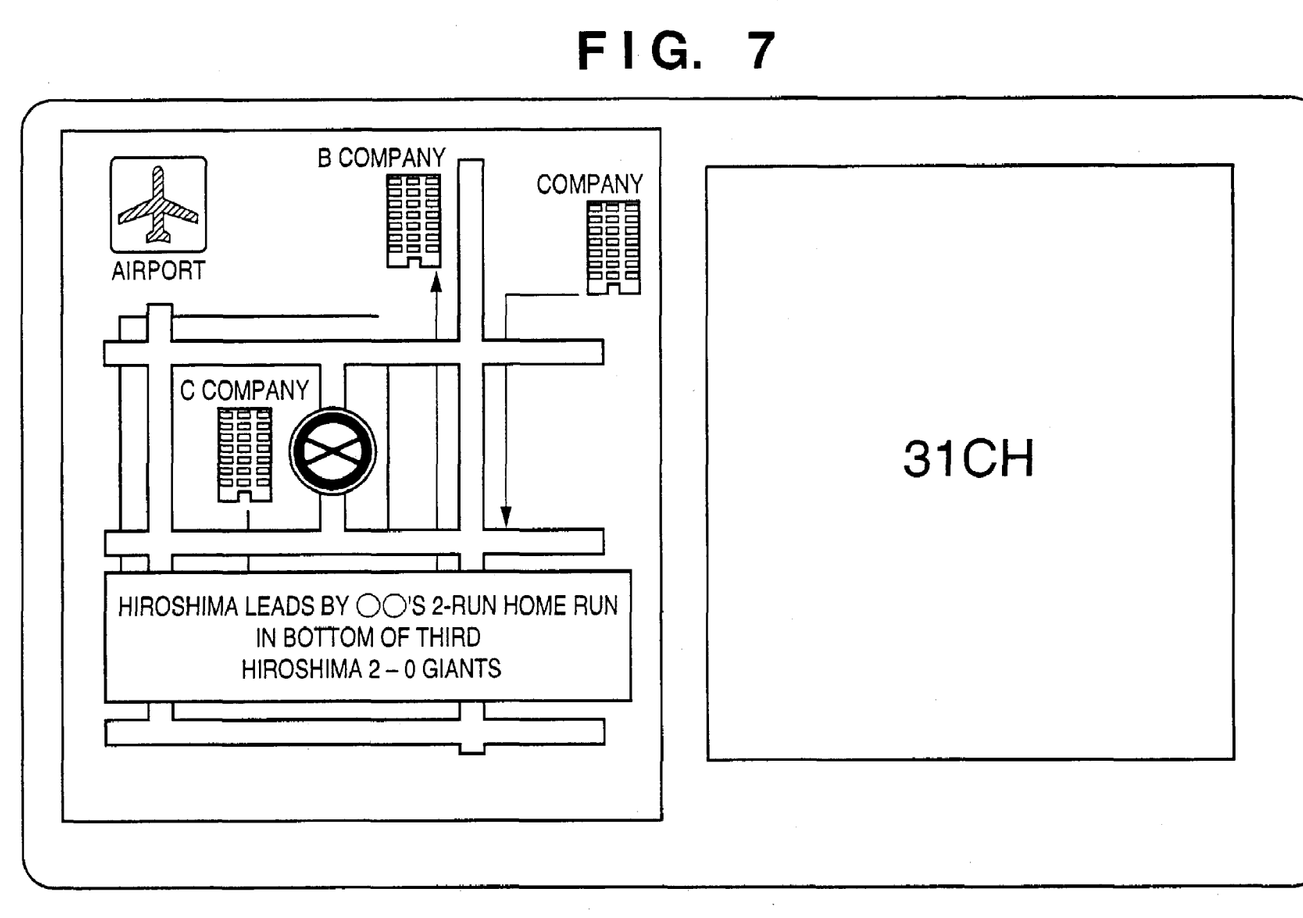
FIG. 7 shows an example of partial contents displayed on a display 18 of the navigation apparatus 2.

Field 6-6: The user can set, e.g., a two-window display using the display 18, text-to-speech conversion of text acquired as an e-mail using synthetic speech, superimposed display (see FIG. 7) on the display 18, and the like as a service method of the contents to be received from the information center 1 in this field.

Field 6-7: The user can set the navigation apparatus 2 mounted on the vehicle 100 or a storage area dedicated to the user terminal 5, which is assured in advance in the database 33 and corresponds to the user, as a service destination (reception place) of the contents to be received from the information center 1 in this field.

When the user has operated a "register" button after he or she has set the aforementioned items, information contents specified by the respective setup items received from the navigation apparatus 2 or user terminal 5 are stored in the database 33 in step S3 as the user setup information of the user of interest (a category of information of user's choice, a condition upon providing that information to the user, a service timing, and the like).

In the above example, the professional baseball has been exemplified. For example, when the user has selected a horse race, soccer, marathon, or the like, he or she can set his or her desired category, service timing, and the like using similar setup items.

Step S4: If the input operation of the user setup information in step S2 has been made at the user terminal 5, information to be stored in the navigation apparatus 2 corresponding to that user terminal (information associated with the service timing of contents in the vehicle, information service method, and the like) is transferred.

Step S5: The information center 1 acquires many unspecified contents provided from the contents service center 6, and temporarily stores them for at least a predetermined period (the temporarily stored many unspecified contents are deleted after an elapse of a predetermined period of time).

Step S6: The information center 1 analyzes many unspecified contents temporarily stored in step S5 on the basis of the user setup information stored in the database 33. As a practical method of analysis in this step, speech analysis may be used if the contents to be analyzed is audio information, or text mining may be used if the contents to be analyzed is text codes.

For example, in the aforementioned example of the baseball live program, a voice of play-by-play announcer undergoes speech analysis to see if the baseball club and/or player of user's choice set in the field 6-1 appear or appears in a live program of interest, and to see if each of designated events set in the field 6-2 has occurred. If the information acquisition source is set in the field 6-5, contents provided from that information acquisition source can be analyzed in step S6.

If a scorer records play by play of the game in an information processing apparatus during the baseball game, and the information center 1 can acquire that recorded information as an identification signal or the like included in that baseball live contents, whether or not an event designated by the user has occurred in that baseball live can be easily and quickly determined by checking that identification signal.

Step S7: The information center 1 extracts contents to be provided to the service destination of user's choice (the navigation apparatus 2 or corresponding user terminal in this case, assume that the navigation apparatus 2 has been selected) set in the field 6-7 among many unspecified contents temporarily stored in step S5 on the basis of the analysis result in step S6 and the user setup information stored in the database 33.

More specifically, in step S7 a part of contents of interest (e.g., a baseball live program), which are selected from the temporarily stored many unspecified contents), is extracted or specified with reference to the detection timing of a given designated event (e.g., on-base, a home run, or the like of a player of user's choice) in the contents of interest in accordance with the start timing and/or end timing of an information service time (period) set in advance in the field 6-3.

Step S8: The information center 1 converts the partial contents extracted or specified in step S7 into a data format (e.g., MPEG-4 compressed information, text information obtained from audio information via speech analysis, or the like) with which the navigation apparatus 2 can implement the service method of user's choice set in advance in the field 6-6. When data provided from the contents service center 6 has already been converted into an appropriate data format, the process in this step may be skipped.

Step S9: The information center 1 transmits the partial contents, the data format of which has been converted in step S8, to the navigation apparatus 2, and the flow returns to step S1.

<Navigation Apparatus 2>

Figure 9:
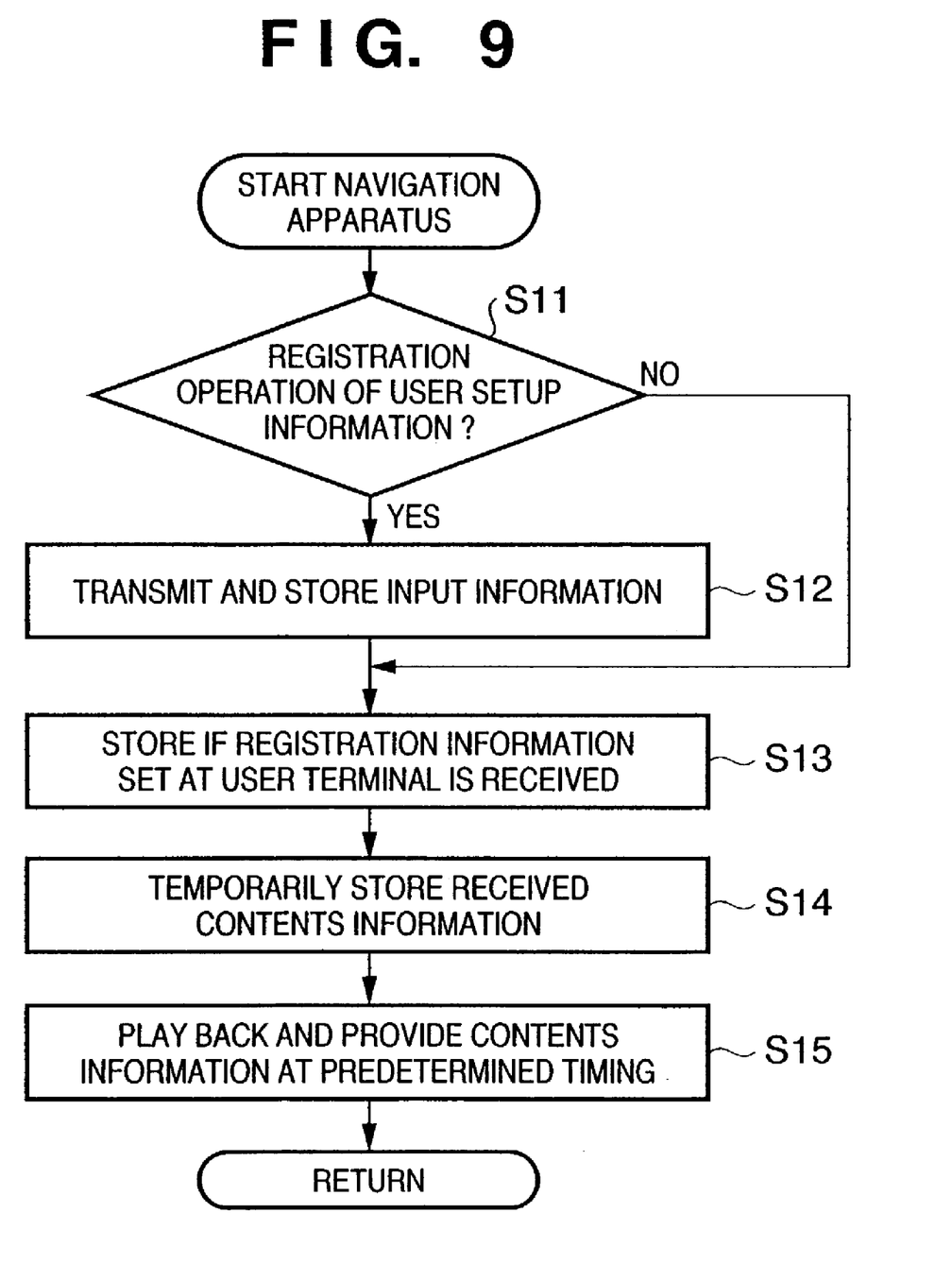
FIG. 9 is a flow chart showing an information acquisition process to be executed by the navigation apparatus 2 in the embodiment of the present invention.

FIG. 9 is a flow chart showing the information acquisition process executed by the navigation apparatus 2 in this embodiment, i.e., the processing sequence to be executed by the CPU 11 of the navigation apparatus 2.

Step S11 in FIG. 9: The navigation apparatus 2 checks if the user has made a registration request operation of user setup information. If that operation has been made, the flow advances to step S12; otherwise, the flow jumps to step S13.

Step S12: The navigation apparatus stores input information set by the user on the aforementioned setup windows shown in FIGS. 3 to 6 in a storage device (not shown), and transmits that information to the information center 1.

Step S13: If the registration operation of the user setup information has been made at the corresponding user terminal 5, since information including the service timing of partial contents, information service method, and the like in the vehicle is transmitted from the process in step S4 in the information service process (FIG. 8) of the information center 1, the navigation apparatus 2 acquires that information, and stores it in a storage device (not shown).

Step S14: The navigation apparatus 2 temporarily stores the partial contents transmitted from the process in step S9 in the information service process (FIG. 8) of the information center 1 in a storage device (not shown).

Step S15: The navigation apparatus 2 provides the partial contents temporarily stored in step S14 to the user by playing them back in accordance with the service timing (e.g., at a stop of the vehicle) and information service method (2-window display or text-to-speech conversion) of the partial contents in the vehicle, which are stored in the storage device (not shown) in step S12 or S13. The flow then returns to step S11.

According to this embodiment, only a required part of information of user's choice can be provided at a timing appropriate for that user.

That is, according to this embodiment, since partial contents which satisfy a category of user's choice are provided at his or her desired timing (e.g., at a stop of the vehicle), various contents that the user does not want can be prevented from being provided endlessly, and only required information can be efficiently acquired, resulting in high convenience.

In the system arrangement according to this embodiment, since the service timing of partial contents to the user is controlled by the navigation apparatus 2 mounted on the vehicle 100, the processing load on the information center 1 can be reduced, and a practical system arrangement can be realized.

According to this embodiment, since many unspecified contents are analyzed by, e.g., speech analysis, text mining, or the like, partial contents that satisfy a category and condition of user's choice can be accurately extracted.

According to this embodiment, if a team or player of user's choice, or a designated event (a home run, replacement of a pitcher, or the offence, on-base, score, and the like of the team or player of user's choice) is detected in many unspecified contents, the information center 1 extracts corresponding partial contents. Hence, the user can selectively acquire only a part on which he or she is keen in a sports live program that normally requires a long period of time, resulting in high convenience.

According to this embodiment, when a desired event set by the user has occurred, the information center 1 can provide partial contents from a timing before that at which the event has occurred, and the user can recognize not only a result of a given event but also a process before that event takes place like a home run or the like in a professional baseball live program. Although the service timing slightly falls behind the actual game timing, high convenience can be maintained since entertainment of partial contents to be provided is not impaired.

In this embodiment, since the user can select, as the service timing of partial contents, "at a stop of the vehicle", as shown in the field 604 of the detail setup window in FIG. 6, the driver's concentration on drive operation can be prevented from being disturbed upon providing his or her desired partial contents.

<Modifications of Embodiment>

Modification 1: The above embodiment has explained the processing arrangement in which the navigation apparatus 2 provides partial contents acquired from the information center 1 at a service timing appropriate for the user.

By contrast, in this modification, when a category of user's choice among many unspecified contents is set by that user as user setup information in the information service process (FIG. 8) executed by the information center 1, contents which satisfy the category of user's choice and an information source that provides the contents (e.g., a channel number, a specific URL (Uniform Resource Locator) on the Internet provided via broadband, or the like) are specified in advance in, e.g., step S3.

If it is determined in step S6 in the information service process (FIG. 8) executed by the information center 1 by analyzing the specified contents which are provided from the information source specified in step S3 that the contents which satisfy the condition of user's choice are currently provided, information that allows the navigation apparatus 2 to directly acquire the contents is provided from the information center 1 to the navigation apparatus 2.

In the above process, whether or not the contents which satisfy the condition of user's choice are currently provided can be determined, e.g., when a condition "replacement of a pitcher" previously set by the user has been satisfied in the baseball live program of the desired baseball club. Also, the information which allows the navigation apparatus 2 to directly acquire contents includes, e.g., a channel number a specific URL (Uniform Resource Locator) on the Internet provided via broadband, an auto-play start control signal of a radio, television, or the like, and so forth.

The navigation apparatus 2 which has acquired that information from the information center 1 gives an appropriate guidance that allows the user to select the target channel number or specific URL on the Internet provided via broadband, or automatically starts playback of a radio, television, or the like.

According to this modification of the processing arrangement, when the user wants to acquire his or her desired contents in real time, that user can adequately acquire the corresponding contents, resulting in high convenience.

Modification 2: In general, when a plurality of passengers travel using a vehicle, since the contents that individual passengers want are normally different, some passengers may be dissatisfied if contents such as a live program of a marathon race or baseball game are provided for a long period of time in a passenger room.

Hence, this modification allows a plurality of users (passengers) to make the setup operation on the setup windows shown in FIGS. 3 to 6 with respect to a single navigation apparatus 2. The information center 1 extracts partial contents which satisfy categories that these users want for that navigation apparatus 2, and the navigation apparatus 2 provides such partial contents desired service timings of respective users.

According to this modification with such processing arrangement, when a plurality of passengers travel using a vehicle, partial contents that individual users want can be equally provided, resulting in high convenience.

In the system arrangement of the above embodiment, the information center 1 appropriately selects contents to be provided to the vehicle side, and the navigation apparatus 2 on the vehicle side provides the acquired contents to a passenger (user). However, the present invention is not limited to such specific system arrangement. That is, when the navigation apparatus 2 has sufficiently high processing performance, the information center 1 may always provide various contents to the navigation apparatus 2 on the vehicle side, and the navigation apparatus 2 may appropriately select contents to be provided to the passenger.

Or in the system arrangement in which the information center 1 not only extracts (specifies) and provides contents to be provided to the passenger, but also determines the service timing of the contents to the user, the processing load on the navigation apparatus 2 mounted on the vehicle 100 can be reduced, and the apparatus arrangement can be simplified.

The present invention which has been explained by way of the above embodiment and its modifications is achieved by supplying a computer program which can implement the functions of the flow charts, that have been referred to upon description of the information center 1 and navigation apparatus 2 (or portable information terminal 3), to the information center 1 and navigation apparatus 2, and reading out and executing that program by a CPU of each apparatus. The computer program supplied to each apparatus may be stored in a storage device such as a rewritable memory, hard disk, or the like.

In the above case, as a method of supplying the computer program to each apparatus, currently prevalent procedures such as a method of installing the program in each apparatus via various recording media such as a floppy disk and the like, a method of externally downloading the program via a communication line such as the Internet or the like, and so forth can be adopted. In such case, the present invention is formed by a code of such computer program or a storage medium.

As many apparently widely different embodiments of the present invention can be made without departing from the spirit and scope thereof, it is to be understood that the invention is not limited to the specific embodiments thereof except as defined in the claims.

What is claimed is:

1. An information service method for providing information from an information service apparatus to a user of an information terminal connected via a communication line, comprising:
   a setting step of allowing the user to set a category used to specify contents that the user wants to receive, a predetermined condition used to specify partial contents of user's choice in contents which belong to the category, and a service timing of the partial contents to the user in the information terminal,
   wherein when a live sports program is selected as the category, said setting step allows the user to set at least one of a team or a player of his or her choice, and an event that may occur during a game, which are associated with the selected live sports program as the predetermined condition, and the contents of the selected live sports program are stored in a database wherein the contents of the live sports program are sequentially stored as an actual game progresses; and
   an information service step of extracting partial contents which satisfy the category and the predetermined condition from many unspecified contents, and providing the extracted partial contents to the user at the service timing in the information terminal,
   wherein said information service step extracts a part of contents associated with the live sports program as partial contents to be provided to the information terminal by analyzing the many unspecified contents on the basis of the predetermined condition associated with the live sports program set as the category in said setting step, and said information service step can extract contents of the live sports program stored in the database as the partial contents to be provided to the information terminal from a timing before occurrence of the event in accordance with a predetermined service period.

2. The method according to claim 1, wherein, when the category and the predetermined condition are set in the information service apparatus while the service timing is set in the information terminal in said setting step, and in said information service step, the information service apparatus provides the partial contents extracted from the many unspecified contents to the information terminal, and the information terminal provides the provided partial contents to the user in accordance with the service timing.

3. The method according to claim 1, wherein, when the category, the predetermined condition, and the service timing are all set in the information service apparatus in said setting step,
   in said information service step, the information service apparatus extracts partial contents to be provided to the information terminal from the many unspecified contents, temporarily stores the extracted partial contents, and provides the temporarily stored partial contents to the information terminal in accordance with the service timing.

4. The method according to claim 1, wherein the sports live program is a professional baseball live program, and the event which may occur during the game includes at least one of a home run, replacement of a pitcher and/or an offence, on-base, and/or score of a team and/or player of user's choice.

5. The method according to claim 1, wherein said setting step allows, when the event which may occur during the game is set, the user to set the predetermined service period.

6. The method according to claim 1, further comprising: a contents specifying step of specifying specific contents which satisfy the category of user's choice from the many unspecified contents on the basis of the category, prior to said information service step, and wherein said information service step provides information that allows the information terminal to directly acquire the specific contents from the information service apparatus to the information terminal when it is determined by analyzing the specific contents specified in said contents specifying step on the basis of the predetermined condition that the specific contents are currently provided while being satisfying the predetermined condition as well as the category.

7. The method according to claim 1, wherein said setting step allows the user to set an acquisition source of the partial contents to be provided to the information terminal.

8. A computer program which issues an operation instruction that makes a computer with a communication function serve as an information service apparatus which provides information to a user of an information terminal connected via a communication line, comprising:
   a program code which implements a setting function for controlling to allow the user to set a category used to specify contents that the user wants to receive, a predetermined condition used to specify partial contents of user's choice in contents which belong to the category, and a service timing of the partial contents to the user in the information terminal,
   wherein when a live sports program is selected as the category, said setting function allows the user to set at least one of a team or a player of his or her choice, and an event that may occur during a game, which are associated with the selected live sports program as the predetermined condition, and the contents of the selected live sports program are stored in a database wherein the contents of the live sports program are sequentially stored as an actual game progresses; and
   a program code which implements an information service function for extracting partial contents which satisfy the category and the predetermined condition from many unspecified contents, and providing the extracted partial contents to the user at the service timing in the information terminal,
   wherein said information service function extracts a part of contents associated with the live sports program as partial contents to be provided to the information terminal by analyzing the many unspecified contents on the basis of the predetermined condition associated with the live sports program set as the category in said setting function, and said information service function can extract contents of the live sports program stored in the database as the partial contents to be provided to the information terminal from a timing before occurrence of the event in accordance with a predetermined service period.

9. An information service apparatus which provides information to a user of an information terminal connected via a communication line, comprising:
   setting means for allowing the user to set, by user's operation of the information terminal, a category used to specify contents that the user wants to receive, a predetermined condition used to specify partial contents of user's choice in contents which belong to the category, and a service timing of the partial contents to the user in the information terminal, wherein when a live sports program is selected as the category, said setting means allows the user to set at least one of a team or a player of his or her choice, and an event that may occur during a game, which are associated with the selected live sports program as the predetermined condition, and the contents of the selected live sports program are stored in a database wherein the contents of the live sports program are seguentially stored as an actual game progresses; and information service means for extracting partial contents which satisfy the category and the predetermined condition from many unspecified contents, and providing the extracted partial contents to the information terminal, wherein said information service means extracts a part of contents associated with the live sports program as partial contents to be provided to the information terminal by analyzing the many unspecified contents on the basis of the predetermined condition associated with the live sports program set as the category in said setting means, and said information service means can extract contents of the live sports program stored in the database as the partial contents to be provided to the information terminal from a timing before occurrence of the event in accordance with a predetermined service period.

* * * * *

UNITED STATES PATENT AND TRADEMARK OFFICE
CERTIFICATE OF CORRECTION

PATENT NO. : 7,026,915 B2  
APPLICATION NO. : 10/372268  
DATED : April 11, 2006  
INVENTOR(S) : Hiroshi Ohmura et al.

Page 1 of 1

It is certified that error appears in the above-identified patent and that said Letters Patent is hereby corrected as shown below:

Title Page, Column 1 (Inventors), Line 2, change "Kouji" to --Koji--.

In the specification:

Col. 6, line 64, after "only" delete "."

Col. 7, line 38, after "shown in" insert --FIG. 5 exemplifies a state wherein the user has set "area information" as a category of weather of his or her choice, and "when chance of rain has changed to 70% or higher" as a service timing.--

Col. 7, lines 39 - 42, delete " FIG. 5 exemplifies ........ as a service timing."

Col. 8, line 25, change "user Is" to --user's--

Col. 9, line 59, after "terminal" inert --5:--

Col. 13, line 62, after "pitcher" insert --,--

Col. 15, line 9, change "seguentially" to --sequentially--

Signed and Sealed this

Tenth Day of April, 2007

JON W. DUDAS  
*Director of the United States Patent and Trademark Office*